Patented Dec. 12, 1950

2,533,840

UNITED STATES PATENT OFFICE 2,533,840

PROCESS FOR INHIBITING FRETTING CORROSION

Theodore G. Roehner, Mount Vernon, and Chester D. Thayer, Baldwin, N. Y., assignors to Socony-Vacuum Oil Company, Incorporated, a corporation of New York No Drawing. Application September 30, 1948, Serial No. 52,138

4 Claims. (Cl. 252—19)

This invention relates to a method for inhibiting fretting corrosion of closely fitted metal parts subject to vibration but substantially no relative movement by applying a film of a paste containing suspended indium in finely divided form at the metal-metal interface.

The rapid corrosion that occurs at the interface between contacting, highly-loaded metal surfaces when subjected to vibratory motions has become known as fretting corrosion. This form of corrosion is damaging to a large variety of machine parts because it leads to fatigue failures and results in loss of dimensional accuracy.

Fretting corrosion is usually characterized by surface discoloration and pitting in regions where vibrating movement of highly-loaded metallic surfaces has occurred. Since fretting corrosion is a plague of loaded surfaces, it follows that the effects of the damage are frequently quite serious. The pits are the results of stress concentration due to applied loads and, therefore fatigue failures often have their origin in fretted areas. The tendency in machine design is toward operation at ever increasing stresses, but each increment of stress magnifies the importance of fretting corrosion.

The problem is not one of lubrication. The type of corrosion under discussion may occur despite the presence of lubricants capable of withstanding very high bearing pressures and the composition used in the method of this invention need not be capable of withstanding high bearing pressures without failure.

An excellent illustration of the principles of the invention is in the inhibition of fretting corrosion at the surfaces where the races of ball or roller bearings contact a shaft and housing. For example, high speed grinding and boring heads may be mounted on spindles carried by ball or roller bearings. The high degree of accuracy required of these heads necessitates very accurate mounting. The balls or rollers and the races are accurately made and hardened. The relatively moving parts, namely the balls or rollers and the surfaces of the races contacted thereby are well lubricated. The races are closely fitted to the spindle and housing, respectively, and exhibit no discernible relative movement at the metal-metal interfaces. Yet these interfaces show serious fretting corrosion with resultant loss of dimensional accuracy. This effect cannot be inhibited by lubrication. As fretting corrosion proceeds, the fit between the spindle and inner race and between the housing and outer race is lost and accuracy of the head is destroyed even though the bearing may be in perfect condition as regards the balls or rollers and the surface of the races on which they roll. The bearing may be kept in excellent condition for long periods of normal use by proper lubrication, but the utility of the machine will be lost by fretting corrosion at an interface not subject to appreciable relative movement of the contacting metal surfaces.

Fatigue failures traceable to fretting corrosion are found in many aircraft engine parts, such as connecting rods, knuckle pins, splined shafts, clamped and bolted flanges, couplings and many others. Such failures also occur in railway axle shafts at the wheel seats and in automobile axle shafts, suspension springs, steering knuckles, and other machine parts too numerous to mention here.

Loss of dimensional accuracy as a cause of malfunctioning of metal parts is also a problem of general interest. A long standing and heretofore unsolved service difficulty occurs in the clamp system joining the adjacent ends of railroad rails. The vibratory motion of rails and their clamp plates as each car passes over the joint causes severe fretting corrosion and loss of material. The loss of material is exhibited as looseness of the clamping bolts, which therefore require frequent tightening. Fretting corrosion proceeds at a rapid rate in rail joint clamping systems and creates a service problem as old as the railroad business. Loss of material also results in excessive clearances in splines, taper shafts and couplings which not only destroys the desired fit, but the looseness may increase the working load by impact through lost motion or backlash and thereby cause eventual failure.

Similarly, fretting corrosion causes loss of material in highly loaded bolted assemblies and consequent looseness of clamping bolts and studs. Looseness of bolts and studs increases their liability to fatigue failure, a hazard that is particularly serious when the bolts or studs are short as in aircraft engine cylinder hold-down studs. In some instances, such as in press and taper fits, the products of fretting corrosion accumulate in the corroded region to such extent that difficulty is experienced in disassembling the contacting parts.

Malfunctioning of ball and roller bearings and sometimes of gears results from the loss of material by fretting corrosion. When such bearings are not in motion except for vibratory movements while loaded, as during shipment of electric motors, automobiles, machine tools and other assembled machines in freight cars, fretting corrosion occurs at the points of contact between the balls or rollers with their respective raceways or between gear teeth in mesh. Indentations in balls and rollers may be so serious as to ruin the bearings. Such bearing damage is often erroneously attributed to pressure indentation (Brinelling) because the products of corrosion are washed away by the bearing lubricant leaving only reasonably smooth indentations.

The reason for the almost universal susceptibility of metals to fretting corrosion and the circumstances under which fretting corrosion will occur are imperfectly understood. Possibly, the actual process of corrosion differs little from corrosion that occurs under other circumstances, the name "fretting" being merely descriptive of special conditions or environments. Fretting corrosion may be related to "stress corrosion" or, more accurately, "tension corrosion" since the vibratory movements of the contacting surfaces will necessarily stress those surfaces and thereby promote corrosion.

It is probable that surface damage from another primary cause is sometimes mistaken for fretting corrosion. Highly loaded surfaces subjected to vibratory motion may be bonded or welded together in small areas under the influence of high local temperature resulting from friction. The motion of the compressively loaded surfaces not only generates sufficient local heat to fuse the contacting surfaces but may also clean the surfaces by rubbing away contaminating surface films that might prevent welding. Subsequent relative motion of the fused areas pulls material out of the surfaces causing pits, scratches and fragments which may then corrode. Careful inspection is sometimes necessary to determine whether the original trouble was caused by welding or corrosion. From the standpoint of the resulting damage, it is perhaps not important whether the damage originated from corrosion or from welding. As to applicability of the method of this invention, the distinction is of major importance, since the novel method inhibits fretting corrosion but not welding.

When the heat of friction from vibratory motion is not sufficient to cause local welding, damage by corrosion will still occur. Since this corrosion damage will occur at the interface of any two highly loaded contacting surfaces, providing at least one of them is a metal, it is clear that the process is corrosion without fusion. Thus, fretting corrosion has been observed between such materials as paper and steel, wood and steel, agate and steel, glass and steel, and between many combinations of metals and alloys. That fretting corrosion occurs without fusion is also indicated by the reduced rate of corrosion when tests are conducted in nitrogen or in vacuum.

The susceptibility of the different metals and metal combinations to damage by fretting corrosion varies considerably. Among the ordinary metals, such as steel, brass, chromium, aluminum, nickel and glass tested dry, the best resistance to fretting was found in combinations in which one of the surfaces was brass, while the worst appeared to be stainless steel in any combination.

According to the present invention, fretting corrosion is eliminated or drastically reduced by interposing between the surfaces subject to fretting corrosion a film of a pasty carrier substance having suspended therein a minor amount of finely divided metallic indium.

The carrier is a pasty composition, the sole function of which appears to be to suspend the indium powder and provide for the presence of the effective metal throughout the area of contacting surfaces subject to fretting corrosion. Because of their ability to change little in consistency within a wide temperature range, greases are preferred as carriers. In general, any grease can be used, including gel-type and cup greases. The composition apparently does not act as a lubricant and the only considerations of importance are found to be physical properties of the carrier. The viscosity of the carrier must be great enough to maintain the powdered indium in suspension. Even the most viscous of the oils are incapable of accomplishing this and the carrier should not be a composition capable of liquid flow. The finished composition should be capable of being readily spread over a solid surface. The term "pasty" aptly expresses these characteristics and is used herein as definitive of the physical nature of the carrier. Among suitable carriers may be mentioned certain waxes, petrolatum, animal and vegetable fats of the proper consistency for spreading such as hydrogenated cottonseed oil and lard, and others of similar physical nature, as well as the greases previously mentioned. Silicone polymers and plastic solutions of resins in oil are also effective for the purpose, if of pasty consistency.

The metallic indium is in the form of a fine powder which is incorporated in the grease by mechanical working such as stirring or kneading. In a typical preparation, 20 per cent by weight of sodium fatty acid soap and 80 per cent by weight of a mineral oil fraction having a Saybolt Universal viscosity of 150 seconds at 100° F. were combined to form an anhydrous grease in the conventional manner. This grease was blended with 200 mesh metallic indium powder in the weight ratio of 95 parts of grease to 5 parts of indium powder by mechanical working.

The resulting composition was applied to five grinding head spindles which showed fretting corrosion from previous operation at the interfaces between spindle and inner race and between housing and outer race. The heads were then assembled and operated at from 7000 to 40,000 R. P. M. for 500 hours. On inspection after this run, the progress of fretting corrosion was found to have been drastically reduced by the presence of metallic indium in the pasty carrier (grease).

The compositions of this invention are also effective to inhibit fretting corrosion at the many other surfaces subject to that type of damage as described hereinabove. The manner of application to endangered areas will be obvious from the description of general considerations and of specific tests conducted. The amount of powdered indium for effectiveness in inhibiting fretting corrosion will vary with the circumstances of use and nature of the carrier. In general, the metal should constitute from about 0.1 to about 15 per cent by weight of the novel composition.

We claim:

1. The method of inhibiting fretting corrosion at adjacent faces of closely fitted metal parts subject to vibration but not to substantial relative movement in use which comprises applying between said parts a film of a pasty carrier having dispersed therein about 0.1 to about 15 per cent by weight of finely divided metallic indium.

2. The method of inhibiting fretting corrosion at adjacent faces of closely fitted metal parts, subject to vibration but not to substantial relative movement in use which comprises applying between said parts a film of a gel-type grease having dispersed therein about 0.1 to about 15 per cent by weight of finely divided metallic indium.

3. The method of inhibiting fretting corrosion at adjacent faces of closely fitted metal parts subject to vibration but not to substantial relative movement in use which comprises applying between said parts a film of a pasty carrier having dispersed therein about 5 per cent by weight of finely divided metallic indium.

4. The method of inhibiting fretting corrosion at adjacent faces of closely fitted metal parts subject to vibration but not to substantial relative movement in use which comprises applying between said parts a film of a gel-type grease having dispersed therein about 5 per cent by weight of finely divided metallic indium.

THEODORE G. ROEHNER.
CHESTER D. THAYER.

REFERENCES CITED

The following references are of record in the file of this patent:

UNITED STATES PATENTS

| Number | Name | Date |
|---|---|---|
| 1,758,598 | Frizell | May 13, 1930 |
| 2,354,218 | Murray | July 25, 1944 |

FOREIGN PATENTS

| Number | Country | Date |
|---|---|---|
| 679,495 | France | Jan. 9, 1930 |
| 158,922 | Great Britain | Feb. 24, 1921 |

OTHER REFERENCES

Fretting Corrosion, article in Lubrication, vol. 34, March 1948, pages 25–36, particularly pages 34 and 35.

De Ment et al.: Rarer Metals, pages 35, 37 and 38, published 1946 by Chemical Publishing Co., Inc., of Brooklyn, New York.